US009616588B2

(12) United States Patent
Hardesty (10) Patent No.: US 9,616,588 B2
(45) Date of Patent: Apr. 11, 2017

(54) TOOL FOR FORMING A SIDEWALL SURFACE OF A RECESS IN A WORKPIECE

(71) Applicant: Thermwood Corporation, Dale, IN (US)

(72) Inventor: Michael Hardesty, Dale, IN (US)

(73) Assignee: Thermwood Corporation, Dale, IN (US)

( * ) Notice: Subject to any disclaimer, the term of this patent is extended or adjusted under 35 U.S.C. 154(b) by 266 days.

(21) Appl. No.: 13/794,995

(22) Filed: Mar. 12, 2013

(65) Prior Publication Data

US 2013/0192721 A1    Aug. 1, 2013

Related U.S. Application Data

(62) Division of application No. 12/833,129, filed on Jul. 9, 2010, now abandoned.

(51) Int. Cl.
| B27G 13/14 | (2006.01) |
| B27F 5/02 | (2006.01) |
| B27G 13/00 | (2006.01) |
| F16B 12/12 | (2006.01) |

(52) U.S. Cl.
CPC .............. *B27G 13/14* (2013.01); *B27F 5/02* (2013.01); *B27G 13/002* (2013.01); *F16B 12/12* (2013.01); *F16B 12/125* (2013.01); *A47B 2230/0081* (2013.01); *Y10T 428/24174* (2015.01)

(58) Field of Classification Search
CPC ...................................................... B27G 13/14
See application file for complete search history.

(56) References Cited

U.S. PATENT DOCUMENTS

| 4,475,850 A | * | 10/1984 | Penoza | ..................... B23C 5/10 |
| | | | | 407/53 |
| 2008/0075550 A1 | * | 3/2008 | Reed | ............................. 408/230 |
| 2010/0132841 A1 | * | 6/2010 | Itaya | ........................ B27F 1/16 |
| | | | | 144/237 |

FOREIGN PATENT DOCUMENTS

JP    WO 2009016707 A1 *    2/2009   ............... B27F 1/16

* cited by examiner

*Primary Examiner* — Christopher Schatz
(74) *Attorney, Agent, or Firm* — Bookoff McAndrews, PLLC (57) ABSTRACT

A method of forming a joint between first and second workpieces generally consisting of forming a recess in one of such workpieces, provided with at least one side wall having a serrated cross-sectional configuration with inwardly projecting, distortable segments; providing a portion in the other of such workpieces, insertable into such recess, having a cross-sectional configuration sufficient to engage and distort such segments as such portion is inserted into such recess; and inserting such of the other workpiece into such recess, causing the segments to distort and thus provide an interference fit between such workpieces.

16 Claims, 8 Drawing Sheets

TOOL FOR FORMING A SIDEWALL
SURFACE OF A RECESS IN A WORKPIECE

This is a Divisional application of U.S. patent application Ser. No. 12/833,129 filed on Jul. 9, 2010. The entire disclosure of U.S. patent application Ser. No. 12/833,129 is hereby incorporated by reference.

This invention relates to an method of forming a joint between a pair of workpieces, and more particularly to a such a method that does not require the use of clamping devices in positioning and holding such workpieces together, allowing a bonding agent applied to the joint to set. Such invention further contemplates a product formed through the use of such method and a tool functional to configure such workpieces to facilitate the practice of such method.

BACKGROUND OF THE INVENTION

Figure 1:
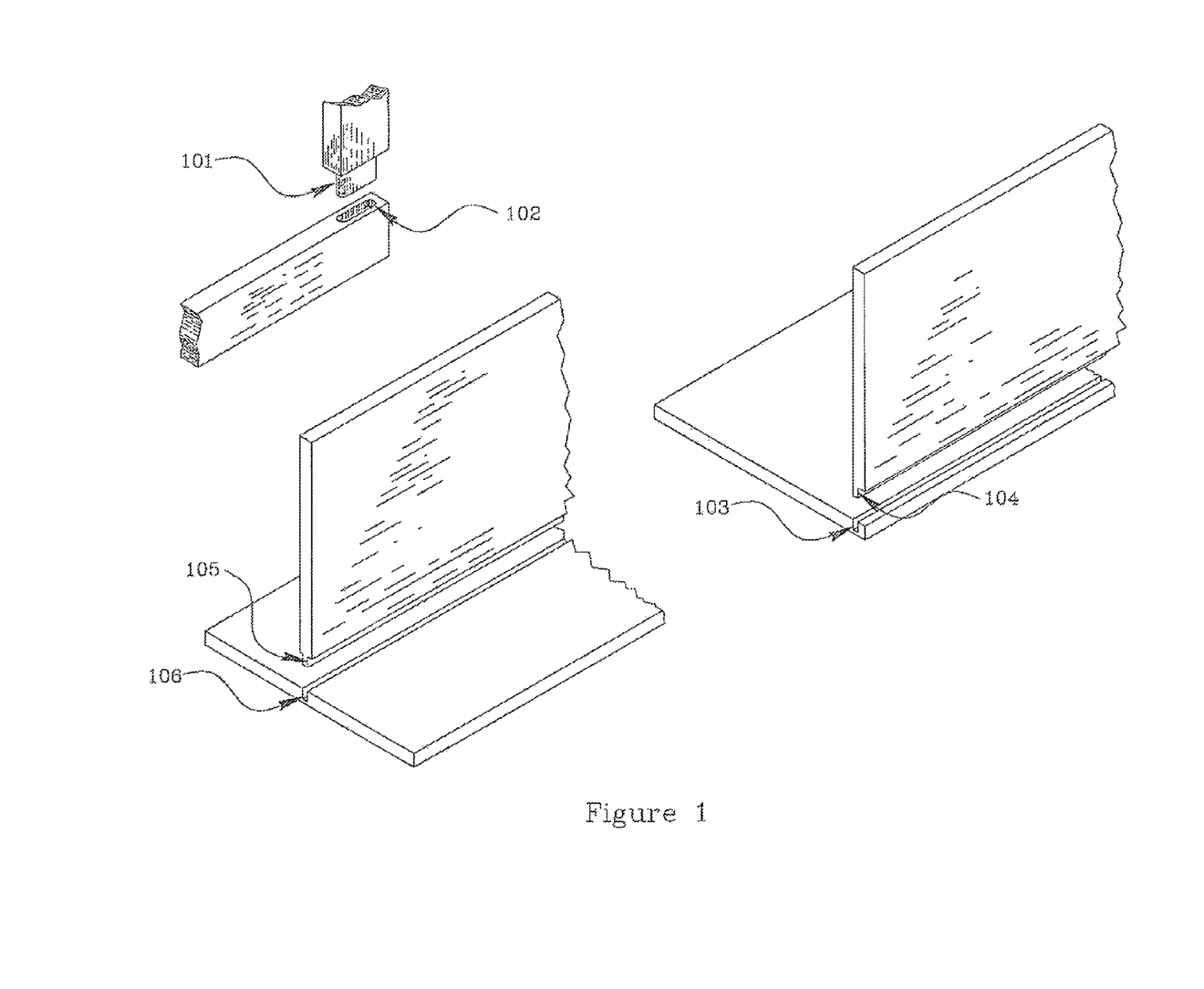
FIG. 1 is a set of perspective views of several combinations of workpieces, illustrating the joining components thereof in exploded relation.

In the manufacture of furniture and other similar products, it is a common practice to utilize mortise and tenon type joints to interconnect various workpieces used to construct a product. The mortise and tenon joint consists of a socket formed in a first workpiece, and a protrusion formed on a second workpiece adapted to be inserted and snuggly fit into the socket or mortise of the first workpiece. In the cabinet-making-industry, the terms mortise and tenon often are used to describe a broad range of joints, utilizing the same method of joining a pair of workpieces. Referring to FIG. 1 of the drawings, a tenon may consists of simply a rabbet formed on the edge of a panel 104 or a tongue formed in the center of an edge of a panel 105. A tenon also may be formed on the end of a style or rail 101. Similarly, a mortise may be a simple pocket cutout 102 or an elongated slot 103 or a groove 103 extending the entire length of a panel. The term tongue and groove sometimes is used to describe the aforementioned type of joint when such joint is used to join large panels in the cabinet industry.

Typically, mortises as well as tenons are formed utilizing various multiple machine operations. One of the problems encountered in the prior art in forming joints is the requirement for clamping mortises together to permit bonding agents used to permanently secure the workpieces together to set. The reliance on clamps for securing such workpieces together presents several major disadvantages. The clamping operation requires the manufacturer to maintain a large inventory of clamps of various sizes to accommodate the many varied work pieces encountered in the course of daily operations. Additionally, a large number of assemblies are generally staged in the clamping process at a given time, awaiting the setting of the bonding agent. Still an additional problem encountered in the prior art is the necessity to provide labor for applying such clamps and subsequently removing them when the bonding agent has cured.

There have been numerous attempts in the prior art to circumvent the clamping operation, including the application of permanent mechanical fasteners such as small nails or brads. Such an operation is undesirable in the sense that it adds additional labor to the construction of the final product, and may detract from the appearance of the product, weaken the completed joint or possibly even result in damaging the material beyond salvage. Accordingly, it is the principal object of the present invention to provide an improved method of joining a pair of workpieces together in the manufacture of a product which eliminates the requirement of the use of various securing devices such as clamps, fixtures and fasteners such as small nails and brads.

SUMMARY OF THE INVENTION

The principal object of the invention is achieved by providing a method of forming a joint between a pair of workpieces, generally consisting of forming a recess in one of such workpieces, provided with, at least one side wall having a serrated cross-sectional configuration with inwardly projecting, distortable segments; providing a portion of the other of such workpieces insertable into the recess of the first workpiece, having a cross-sectional configuration sufficient to engage and distort the inwardly projecting, distortable components of the first member, as such projecting portion is inserted into the recess; and inserting the projecting portion of the other workpiece into such recess causing such segments to distort and thus provide an interference fit between such workpieces. Preferably, a bonding agent is applied to one of the recess and the projecting portion prior to insertion of such portion into the recess of the other workpiece, such distortable segments are provided with sloped surfaces engageable by the insertable portion inserted into the recess of the other workpiece, causing such segments to deflect toward a bottom of the recess and thereby fix the inserted portion within the recess. Such recess may be provided with a circular or polygonal cross-sectional configuration, and the recess one of such workpieces may be provided with a pair of opposed side walls each provided with a serrated cross-sectional configuration, and the insertable portion may be provided with a pair of outer side wall surfaces cooperable with serrated segments of the opposed side wall surfaces of the recess. The recess in one of such workpieces may consist of a mortise, socket, dados, pocket mortise, slot or grove, and the insertable portion of the other workpiece may consist of a tenon, rabbet or tongue.

DETAILED DESCRIPTION OF THE PREFERRED EMBODIMENTS OF THE INVENTION

Generally, in the cabinet making trade, machining operations required for making mortise and tenon joints for joining panels together are performed on a CNC router. The various components comprising the main body of a kitchen cabinet, as an example, are generally machined on a flatbed CNC router, from full sized sheets of panel stock. The process also may be carried out using a handheld portable router, or by using ordinary cabinetmakers' hand tools, although the latter is considered more of an art than a craft.

Figure 3:
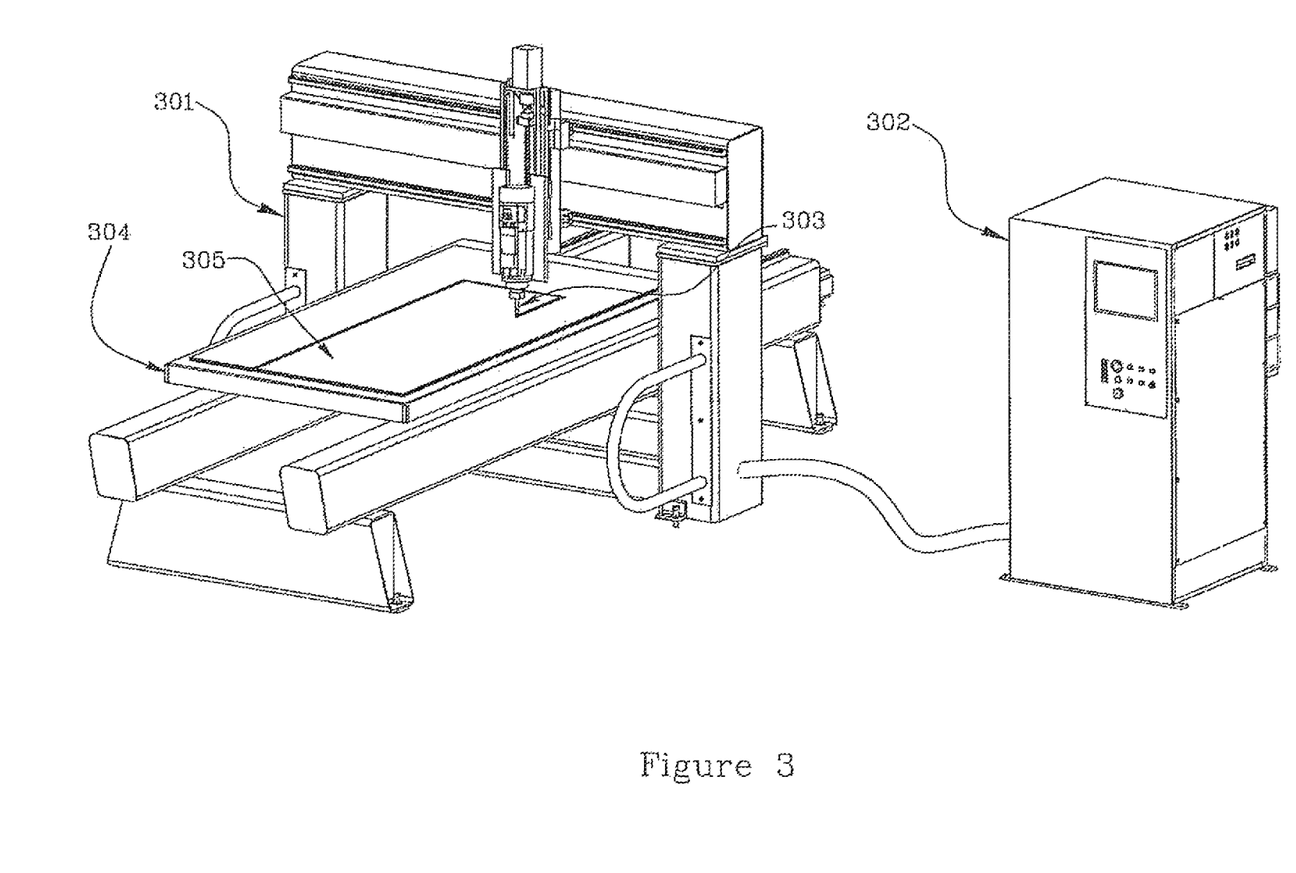
FIG. 3 is a perspective view of a CNC router which may be utilized to form recesses in workpieces intended to be joined together by use of the claimed method.
Figure 4:
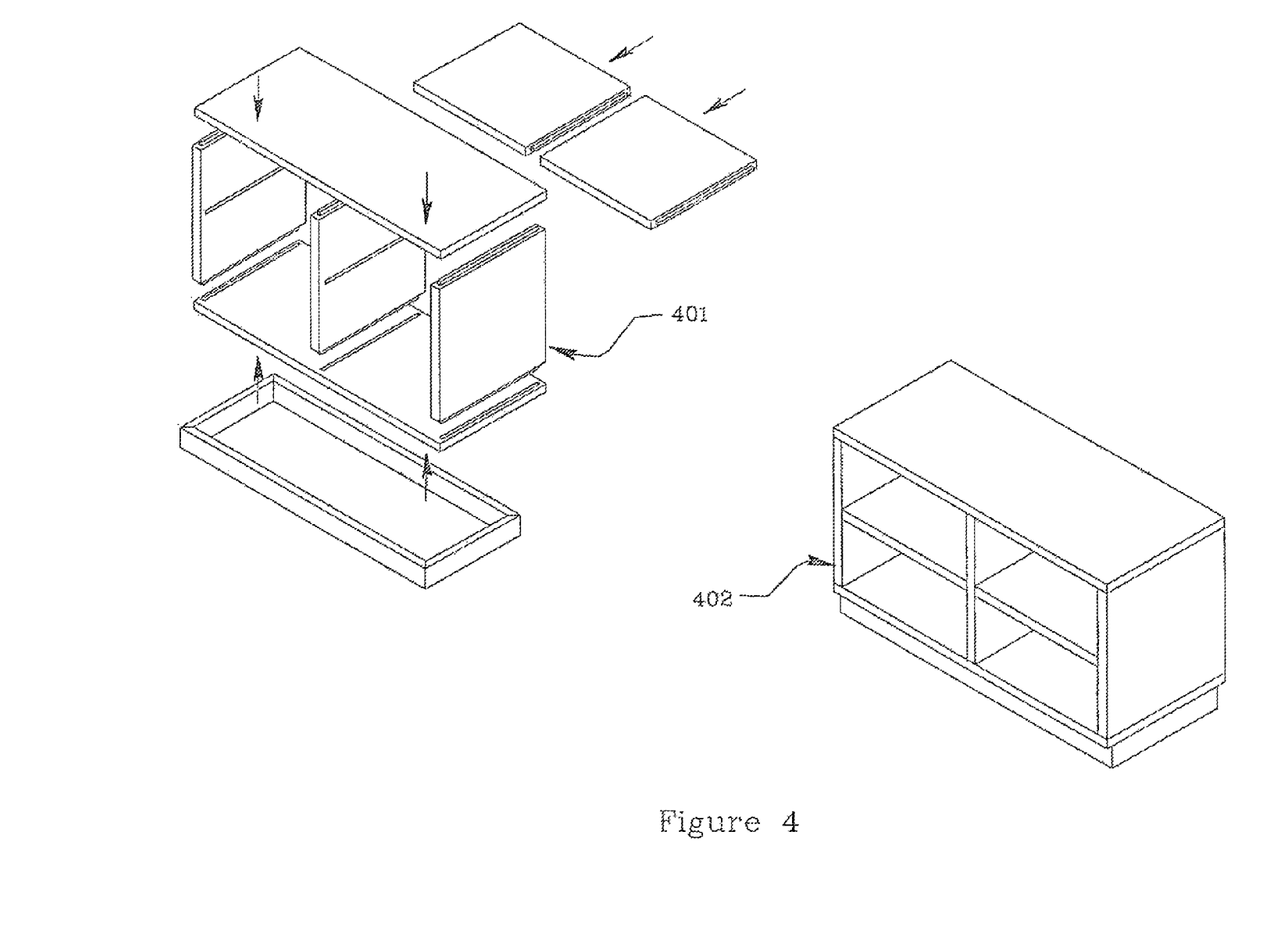
FIG. 4 includes a first perspective view of a number of components of a product to be joined together by use of the claimed method, illustrated in exploded relation, and a prospective view of the product formed of components shown in the other view, secured together by use of the claimed method.

Referring to FIG. 3 of the drawings, in a typical manufacturing environment utilizing a CNC machine 301, components are manufactured by first loading a tool-path program into the machine control 302. Material in the form of full sized sheet stock is then placed upon worktable 302 of the CNC machine. The tool-path program through the computer component of the machine control 302 then guides the tool 304 through multiple program cut paths, producing components that will be configured for assembly into a final product, upon removal from the machine's worktable. FIG. 4 illustrates a set of completed panels 401 and a completed unit 402 assembled from such panels.

Figure 5:
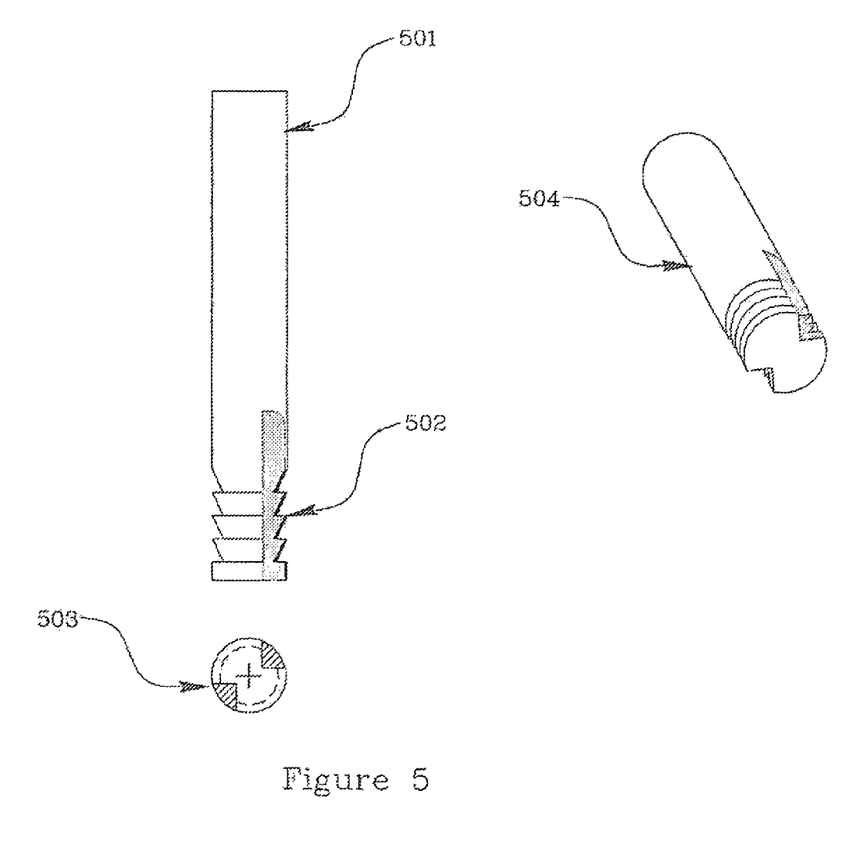
FIG. 5 consists of side, end and prospective views of a tool functional to form a side wall surface of a recess in a workpiece, in accordance with the claimed method.

Referring to FIG. 5, there is illustrated a cutting tool 501 designed to produce a side wall configuration of a groove in a workpiece. The tool consists of an elongated cylindrical body, adapted to be inserted into a collet of a machine spindle, and is provided with a plurality of annular recesses at an end thereof and a pair of longitudinally extending, diametrically opposed grooves in the lower circumferential surface thereof cooperating with such annular recesses to provide a cutting tool configuration functional to produce a serrated cutting pattern. Multiple teeth 502 of the tool impart the unique serrated configuration depicted in the side wall of the groove in work piece 602 shown in FIG. 6. The profile of each tooth formed by the plurality of annular recesses is configured in a manner whereby the upper most edge tapers to a point on the outer circumference of the tool. The tool cuts the material in a manner so as to produce tapered projections on the side wall of a mortise slot.

Figure 6:
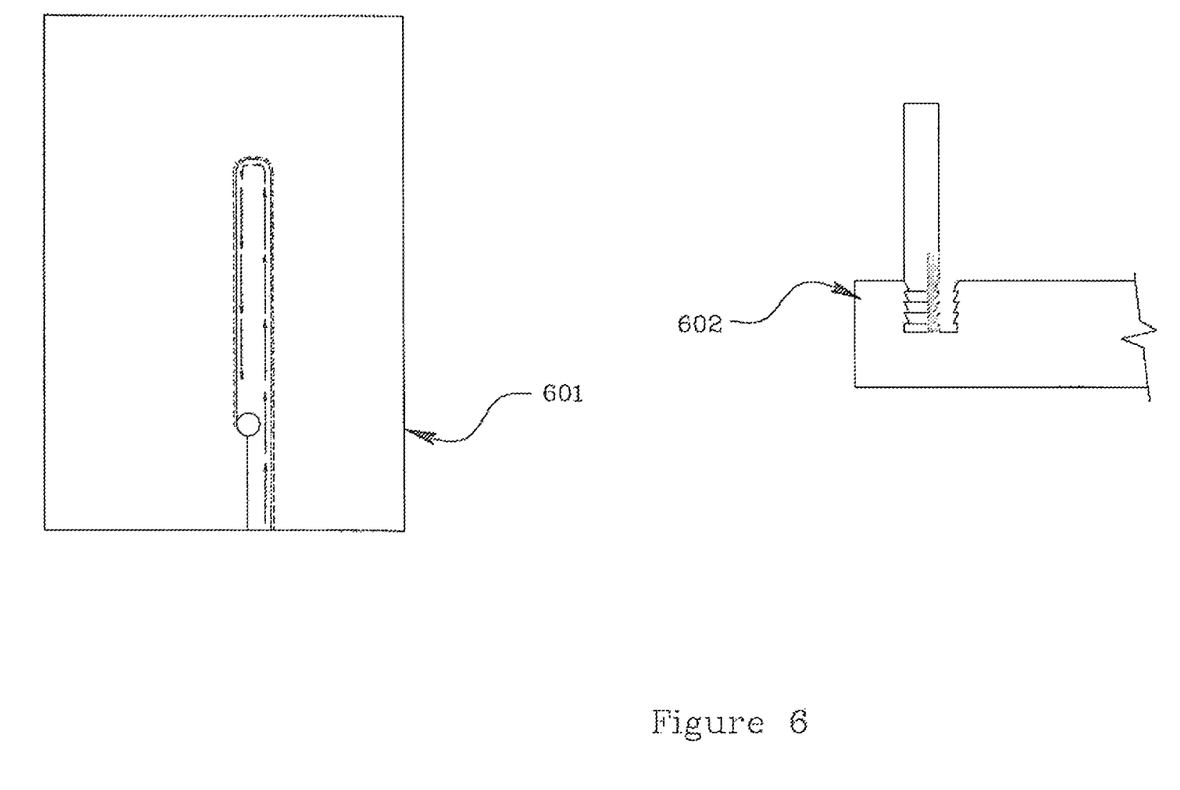
FIG. 6 includes a pair of top and side views illustrating the manner in which the tool illustrated in FIG. 5 may be utilized to form the contours of the side walls of a recess in a workpiece in accordance with the claimed method.

Referring to FIG. 6, the tool shown in FIG. 5 is designed to cut the mortise in two or more passes as depicted in the diagram identified by the reference numeral 601, providing for chip removal as well as for more finely machining the width of the mortise to a precise dimension. The tool may enter the work piece from an end thereof or it may enter the material through the top surface for producing blind dados or pocket mortises. The tapered side wall projections are best illustrated in the recess formed in workpiece 602 shown in FIG. 6.

Figure 7:
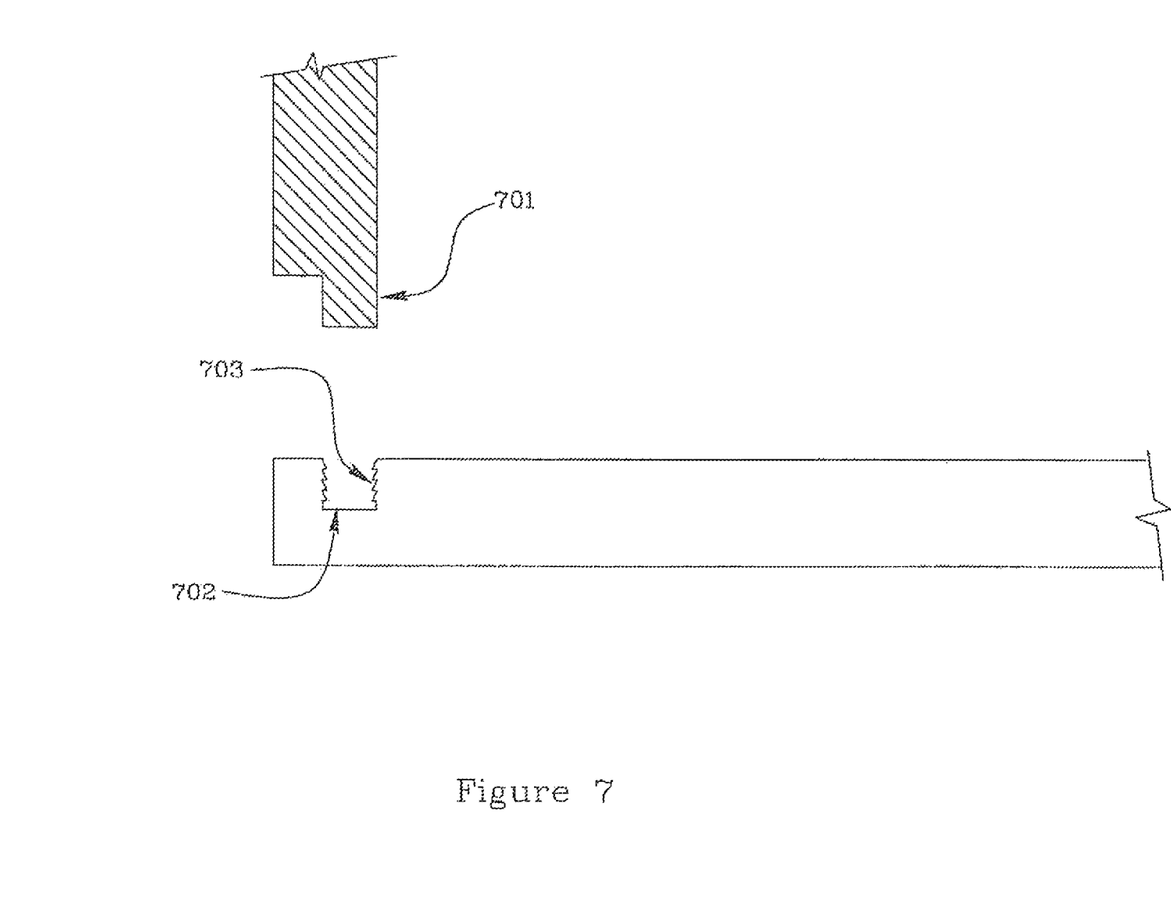
FIG. 7 is a side elevational view of a pair of workpieces to be joined together utilizing the claimed method, shown in exploded relation.
Figure 8:
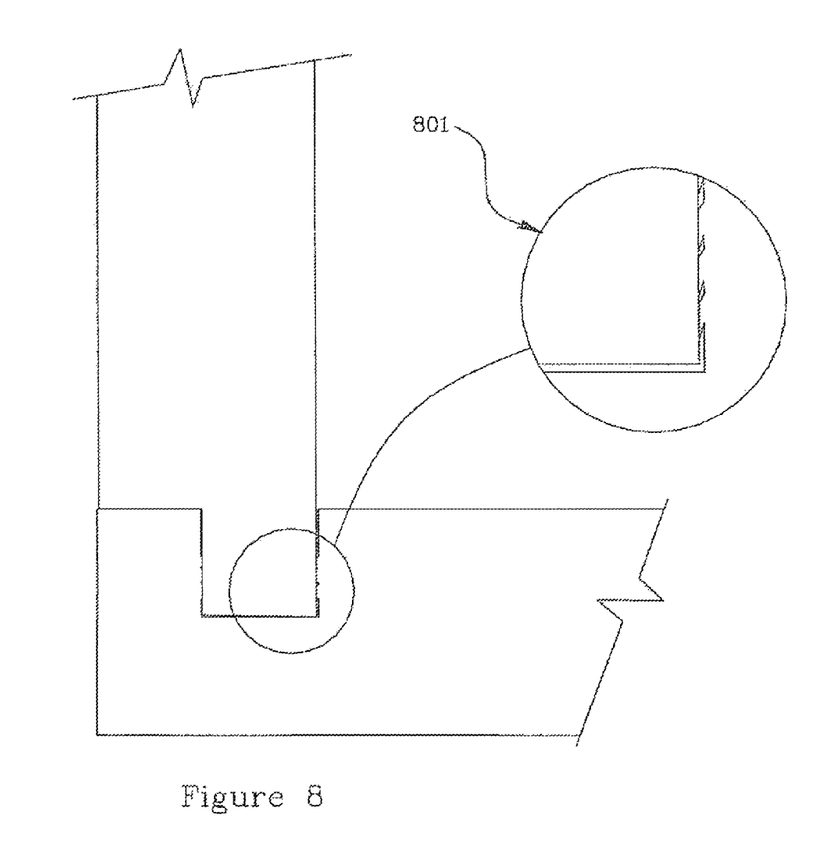
FIG. 8 is a side elevational view of the components shown in FIG. 7 joined together through the use of the claimed method.

FIGS. 6 through 8 illustrate the use of the inventive method in joining a pair of workpieces together. Initially, as shown in FIG. 6, a mortise is formed in one of the workpieces usually by the use of a CNC router as shown in FIG. 3. Once the mortise has been formed, a tool as shown in FIG. 5 is utilized to form a serrated configuration on the side walls of the mortise in workpiece 602 as shown in FIG. 6. Next, as shown in FIG. 7, a bonding agent is applied to mortise 702, tenon 701 of the second workpieces aligned with mortise 702 provided with serrated side walls 703 and tenon 701 is inserted into mortise 702 to complete the joint as shown in FIG. 8. As tenon 701 is inserted in mortise 702 the inwardly projecting segments of the serrated side wall surfaces of the mortise will be caused to deform and deflect downwardly providing an interference fit of tenon 701 in mortise 702. Such interference fit secures the two workpieces in the desired relationship, allowing the bonding agent to cure and thus permanently secure the two components together in the desired relationship.

To facilitate the insertion of the tenon on one workpiece into the mortise of the other workpiece, the surfaces of the inwardly projecting segments of the serrated side wall surfaces of the mortise engaged by the tenon are sloped downwardly and inwardly as best shown in FIGS. 6 and 7. Such sloped surfaces are provided by forming the annular recesses in the lower end of tool 501 with frusto-conical configurations as shown in FIG. 5.

As previously indicated, the mortises and tenons of the workpieces to be joined by the use of the purposed method may be provided with circular or polygonal cross-sectional configurations, the recess of one of the workpieces may consist of a mortise, socket, dados, pocket mortise, slot or groove and the insertable portion of the other of such workpieces may consist of a tenon, rabbet or tongue.

Figure 2:
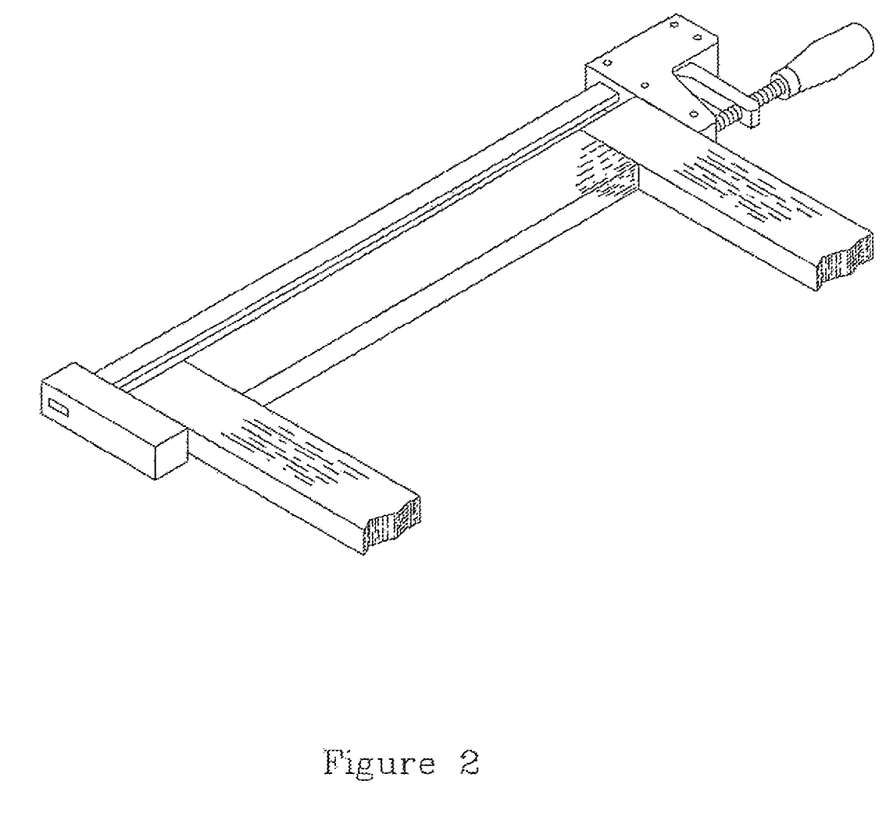
FIG. 2 is a perspective view of a set of components joined together utilizing a clamping device, in the conventional manner.

The use of the method as described permits the production of a set of component workpieces and the assembly of such workpieces into a final product as shown in FIG. 4 without the use of clamping devices as shown in FIG. 2. The cost of acquiring or producing and the inventorying of a number of clamps as shown in FIG. 2 is eliminated, and the time required in applying such clamping devices is avoided thus improving productivity in the process of producing products formed of such workpieces.

The proposed method is particularly suited to the manufacture of wood products such as kitchen cabinets and furniture because of the composition of wood material which permits it to be readily machined to provide serrated side wall surfaces in which the projecting segments of such serrated side wall surfaces may be readily engaged by an inserted tenon or the like and deflected downwardly toward the bottom of the mortise in which the tenon is inserted to provide the interference fit between the workpieces, causing them to maintain their interrelationship, allowing an applied bonding agent to set and thus permanently secure such workpieces together.

From the foregoing detailed description, it will be evident that there are a number of changes, adaptations and modifications of the present invention, which come within the province of those persons having ordinary skill in the art to which the aforementioned invention pertains. However, it is intended, that all such variations not departing from the spirit of the invention be considered as within the scope thereof as limited solely by the appended claims.

I claim:

1. A tool, comprising:
    an elongated body having a central axis, a proximal region, and a distal region;
    a plurality of recesses, wherein each recess is defined by one of a plurality of linearly displaced, continuous annular paths extending around a periphery of the elongated body at the distal region, wherein an entirety of each annular path (i) lies on a plane that is perpendicular to the central axis of the elongated body and (ii) is parallel to an entirety of each other path, and wherein each recess comprises:
    a distal surface extending from the periphery of the elongated body towards the central axis of the elongated body in a direction perpendicular to the central axis of the elongated body; and a proximal surface sloping from the periphery of the elongated body towards the central axis of the elongated body and towards the distal surface, wherein each recess is positioned adjacent to at least one other recess such that the plurality of recesses cooperatively form a serrated periphery at the distal region, and wherein the proximal and distal surfaces meet at a point; and at least one groove intersecting at least one of the plurality of paths.

2. The tool of claim 1, wherein at least one of the distal surface and the proximal surface of each recess forms a tapered edge with at least one of the proximal surface and the distal surface of an adjacent recess.

3. The tool of claim 1, wherein the at least one groove intersects each of the plurality of paths.

4. The tool of claim 3, further comprising at least one cutting edge where the groove intersects each of the plurality of paths.

5. The tool of claim 1, further comprising at least two grooves, wherein each groove intersects at least one of the plurality of paths.

6. The tool of claim 5, wherein the two grooves intersect each of the plurality of paths.

7. The tool of claim 1, wherein the at least one groove extends to a distal-most end of the elongated body.

8. The tool of claim 1, wherein the at least one groove extends proximal of the plurality of recesses.

9. The tool of claim 1, wherein the at least one groove has a long axis that is parallel to the central axis of the elongated body.

10. A tool, comprising:

an elongated body having a central axis, a proximal region, and a distal region;

a plurality of recesses comprised of a plurality of parallel, linearly displaced continuous annular paths extending around a periphery of the elongated body at the distal region, wherein an entirety of each annular path is disposed on a plane that is perpendicular to the central axis of the elongated body, and wherein each recess comprises:

a distal surface extending towards the central axis of the elongated body in a direction perpendicular to the central axis of the elongated body; and a proximal surface sloping towards the central axis of the elongated body and towards the distal surface, wherein each recess is positioned adjacent to at least one other recess such that the plurality of recesses cooperatively form a serrated periphery, and wherein the proximal and distal surfaces meet at a point; and at least one indentation interrupting at least one of the plurality of paths, the indentation extending parallel to the central axis of the elongated body.

11. The tool of claim 10, wherein the at least one indentation has a depth that is equal to or greater than a depth of each of the plurality of recesses.

12. The tool of claim 10, comprising at least two indentations interrupting at least one of the plurality of paths.

13. The tool of claim 12, wherein each of the at least two indentations extends from a distal-most end of the elongated body to a position on the elongated body that is proximal of the plurality of recesses.

14. A tool, comprising:

an elongated body having a central axis, a proximal region, and a distal region;

a plurality of recesses formed of parallel, linearly displaced continuous annular paths extending around a periphery of the elongated body at the distal region, wherein an entirety of each annular path is disposed on a plane that is perpendicular to the central axis of the elongated body, and each plane on which a path is disposed is parallel to each other plane on which a path is disposed, and wherein each recess is adjacent to at least one other of the plurality of recesses such that at least one of a distal surface and a proximal surface of each recess and at least one of the proximal surface and the distal surface of the at least one adjacent recess cooperatively form a serrated periphery, and wherein the proximal and distal surfaces meet at a point; and at least one groove intersecting at least one of the plurality of paths.

15. The tool of claim 14, wherein the distal surface of each recess extends from a periphery of the distal region towards the central axis of the elongated body in a direction perpendicular to the central axis of the elongated body; and the proximal surface of each recess slopes from the periphery of the distal region towards the central axis of the elongated body and towards the distal surface.

16. The tool of claim 14, wherein the at least one groove intersects each of the paths.

* * * * *